Jan. 23, 1945.  L. E. KELLEY  2,367,874
TRAILER COUPLING PIN
Filed Dec. 18, 1943
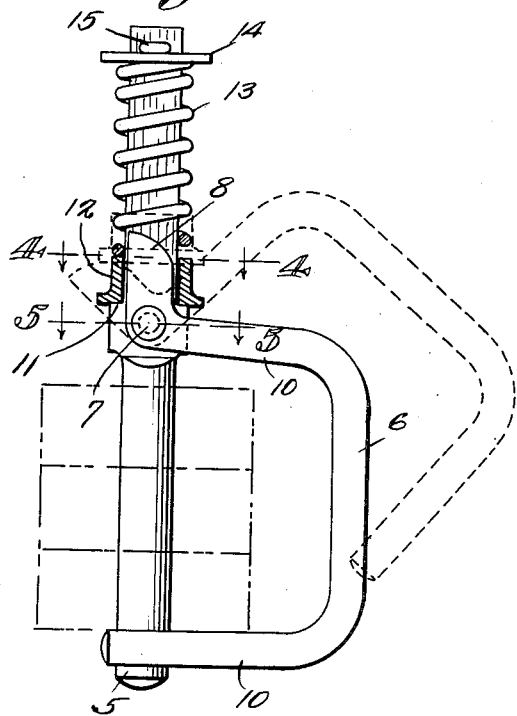
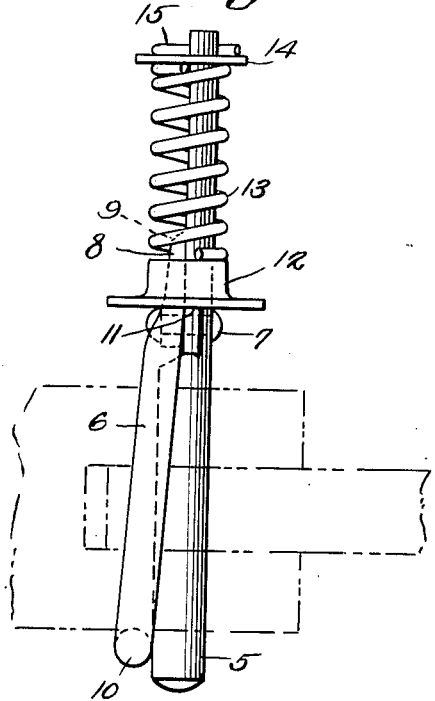
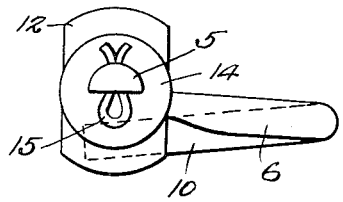
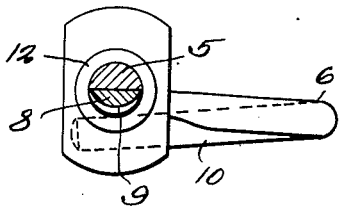
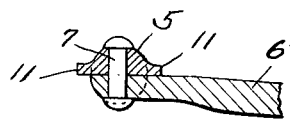
L. E. Kelley
INVENTOR.
BY *C. A. Knowles.*
ATTORNEYS.

Patented Jan. 23, 1945

2,367,874

UNITED STATES PATENT OFFICE 2,367,874

TRAILER COUPLING PIN

Lawrence E. Kelley, Howe, Tex., assignor of one-half to William Henry Long, Howe, Tex.

Application December 18, 1943, Serial No. 514,839

4 Claims. (Cl. 280—33.15)

This invention relates to coupling pin construction, and particularly to coupling pins used in coupling trailers to their towing vehicles.

The primary object of the invention is to provide pin of this character which will be secured against accidental displacement, and one which may only be released, by manual operation of the locking arm and spring pressed locking collar, forming the coupling lock.

Another object of the invention is to provide a pivoted locking arm adapted to cooperate with a coupling pin in holding the coupling pin in its active position.

Still another object of the invention is to provide means for holding the locking arm in its inactive position, to permit the pin to be positioned with one hand, leaving the other hand free to line up the openings of the trailer tongue and hitch bar of the towing vehicle, for the reception of the coupling pin.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing:

Figure 1 is an elevational view illustrating a coupling pin equipped with a pivoted locking arm constructed in accordance with the invention, the locking collar being shown in section.

Figure 2 is a front elevational view of the coupling pin.

Figure 3 is a plan view thereof.

Figure 4 is a sectional view taken on line 4—4 of Figure 1.

Figure 5 is a sectional view taken on line 5—5 of Figure 1.

Referring to the drawing in detail the coupling pin is indicated by the reference character 5, and is provided with a flat surface, over which the pivoted locking arm 6 swings, the pivoted locking arm 6 being connected with the pin 5, by means of the pivot pin 7. As clearly shown by Fig. 2 of the drawing, the locking arm 6 is mounted on the coupling pin, so that it is slightly offset, to permit the locking arm to move over the edge of the coupling pin. The locking arm 6 is substantially U-shaped, and is formed with an extension 8 that has a rounded edge 9, the extension extending an appreciable distance beyond the pivot pin 7, and being disposed at right angles to the leg 10 of the pivoted locking arm 6, so that when the pivoted locking arm is in its locking position, the extension 8 will lie in parallel relation with the coupling pin.

A shoulder indicated at 11 is formed on the coupling pin, at a point adjacent to the pivot pin 7, the shoulder providing an abutment for the locking collar 12 that is mounted on the coupling pin 5, for movement longitudinally thereof.

Mounted on the upper end of the coupling pin 5, is a coiled spring 13, which has one end thereof resting against the locking collar 12, the opposite end of the spring being held against movement, by the disk 14 which is secured on the upper end of the coupling pin, and held in place by means of the cotter pin 15.

When the locking arm 6 is in the position as shown in full lines in Fig. 1 of the drawing, it will be seen that the coupling pin will be securely held within the openings of a trailer tongue and tractor hitch of a towing vehicle, and can only be removed by sliding the locking collar along the locking pin, to disengage the extension 8. The locking arm may now be swung to the position as shown in dotted lines in Fig. 1, whereupon the locking collar when released, will exert pressure against the rounded edge 9 of the locking arm, to hold the locking arm in its inactive position as shown in dotted lines. With the locking arm in this position, it will be obvious that a person may readily align the openings of the trailer tongue with the motor vehicle tractor hitch, and the coupling pin positioned in the aligned openings, while the coupling pin is being held in one hand of the person coupling the trailer to a towing vehicle.

After the coupling pin has been properly positioned, the locking arm may be pushed towards the coupling pin or to the position as shown in full lines in Fig. 1 of the drawing, where the coupling pin will be securely held against accidental displacement. It will of course be understood that when the locking arm is moved to its locking position, the collar 12 automatically moves to the position shown by Fig. 1, where it encircles the extension 8 of the locking arm preventing movement of the locking arm.

What is claimed is:

1. In a coupling pin, a pin section adapted to be positioned in aligning openings of bars to be coupled, a locking arm pivotally connected with the pin section, an extension on the locking arm adapted to lie in parallel relation with the pin section, a spring pressed collar mounted on the coupling pin, said collar adapted to move to a position over the extension, securing the locking arm in its locking position, and the free end of said locking arm adapted to move into engagement with the pin section securing the pin section within the openings of the bars coupled.

2. In a coupling pin, a pin section adapted to be positioned in aligning openings of bars to be coupled, a locking arm pivotally connected with the pin section, an extension on the locking arm and adapted to lie in parallel relation with the pin section, said extension having a curved end, a collar mounted on the pin and adapted to move longitudinally thereover, said collar adapted to move over the extension, securing the locking arm against movement, a coiled spring adapted to urge the collar over the extension, securing the locking arm in its locking position, and said collar adapted to engage the curved end of the extension when the free end of the locking arm is moved away from the pin, holding the locking arm in its open position.

3. In a coupling pin, a main pin section adapted to be positioned in aligning openings of bars to be coupled, a substantially U-shaped locking arm, means for pivotally connecting one end of the locking arm to said main pin section, said locking arm adapted to extend around the bars coupled and engage the pin section when the locking arm is in its closed position, whereby the pin section is held within said opening, an extension formed at one end of the locking arm, and a securing collar slidably mounted on the pin section adapted to engage the extension, securing the locking arm in either its closed position or in its open position.

4. In a coupling pin, a main pin section adapted to be positioned in aligning openings of the bars to be coupled, a shoulder on the pin section, a locking collar movable longitudinally of the pin section, a coiled spring adapted to urge the collar towards the shoulder, a locking arm pivotally connected to the pin section at a point intermediate the ends of the pin section, an extension on said locking arm, said extension adapted to lie in parallel relation with the pin section, said locking collar adapted to move over said extension, holding the locking arm in its closed position, and said collar adapted to engage the end of the extension, securing the locking arm in its open position under certain conditions.

LAWRENCE E. KELLEY.